United States Patent
Awad

(10) Patent No.: US 7,862,843 B2
(45) Date of Patent: Jan. 4, 2011

(54) METHOD OF SANITIZING A BIOLOGICAL TISSUE

(75) Inventor: Aziz C. Awad, Westland, MI (US)

(73) Assignee: UrthTech, LLC, Farmington Hills, MI (US)

(*) Notice: Subject to any disclaimer, the term of this patent is extended or adjusted under 35 U.S.C. 154(b) by 1034 days.

(21) Appl. No.: 11/031,935

(22) Filed: Jan. 7, 2005

(65) Prior Publication Data

US 2005/0202137 A1 Sep. 15, 2005

Related U.S. Application Data

(60) Provisional application No. 60/536,490, filed on Jan. 14, 2004.

(51) Int. Cl.
*A23L 3/34* (2006.01)
(52) U.S. Cl. .................. 426/532; 426/574; 426/641; 426/652
(58) Field of Classification Search ............... 426/532, 426/574, 641, 652, 657
See application file for complete search history.

(56) References Cited

U.S. PATENT DOCUMENTS 6,796,892 B2 * 9/2004 Allen et al. .......... 452/106

7,001,873 B2 * 2/2006 McDonnell et al. ......... 510/161
2004/0213750 A1 10/2004 Bennett et al.

FOREIGN PATENT DOCUMENTS

EP 0 079 579 5/1983

OTHER PUBLICATIONS

Wells et al., The Veterinary Record 142: 103-106 (1998).
Will et al., The Lancet, 347: 921-925 (1996).
Ironside, FEMS Immunology and Medical Microbiology 21: 91-95 (1998).
Prusiner and Scott, Annu. Rev. Genet., 31: 139-75 (1997).
Hilton et al., Research Letter, 352 : 703-704 (1998).
Schreuder et al., The Veterinary Record 142: 564-568 (1998).
Rogers et al., Irish Journal of Agricultural and Food Research 39: 229-234 (2000).
Kimberlin et al., Journal of the Neurological Sciences 59: 355-369 (1983).
Taylor, Journal of Food Safety 18: 265-274 (1998).
Brown et al., The New England Journal of Medicine 306:1279-1282 (1982).
Health Care Issues of the American Neurological Society (Rosenberg et al., 1986).
Parchi et al., Annals of Neurology 39: 767-778 (1996).

* cited by examiner

*Primary Examiner*—Leslie Wong
(74) *Attorney, Agent, or Firm*—Ian C. McLeod; Steven M. Parks

(57) ABSTRACT

A method for treating biological tissue, particularly meats for human consumption, so as to sanitize the tissue, is described. The method inactivates microorganisms and pathogenic prions (proteins) in the tissue.

24 Claims, 5 Drawing Sheets

Figure 4:
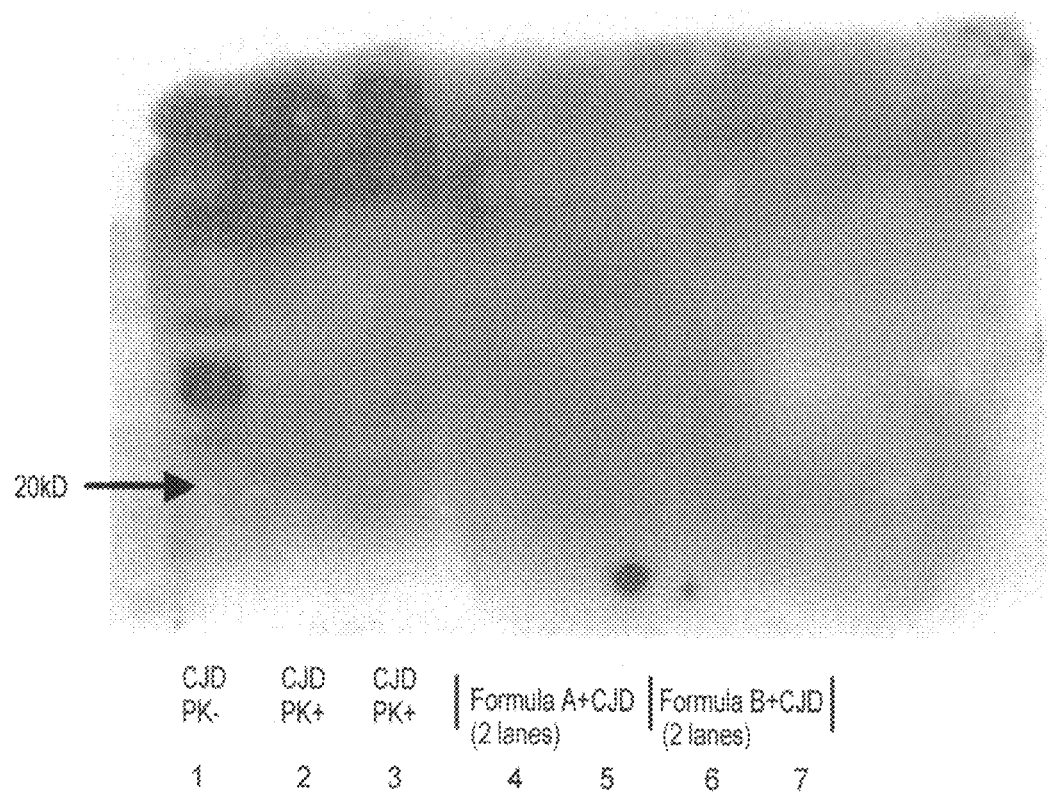

2 lbs fresh whole muscle (one piece with or w/o bones) from beef round or chuck experimentally contaminated with nervous tissues (>10 – 11 $\log_{10}LD_{50}$/g of tissue) from BSE positive cows

↓

Spray-wash at high pressure with 1 N KOH at room temperature

↓

Soak in 3 liters 1 N KOH for 60 min at room temperature

↓

Rinse with water

↓

Soak in 3 liters 1 N HCl at room temperature for 60 min

↓

Rinse with water

↓

Trim the external layer that was exposed to the chemicals

↓ ↓

Trimmings are rendered      Trimmed whole muscle is processed for retail cuts using conventional techniques

FIG. 1

2 lbs fresh whole muscle (one piece with or w/o bones) from beef round or chuck experimentally contaminated with nervous tissues (>10 – 11 $\log_{10}LD_{50}$/g of tissue) from BSE positive cows

↓

Spray-wash at high pressure with 1 N KOH at room temperature

↓

Soak in 3 liters 1 N KOH for 60 min at room temperature

↓

Rinse with water

↓

Soak in 3 liters 0.4 M citric acid at room temperature for 60 min

↓

Rinse with water

↓

Grind using meat grinder equipped with ⅛" plate

↓

Ground meat free of infectious agents for use in food products.

FIG. 2

2 lbs fresh whole muscle (one piece with or w/o bones) from beef round
or chuck experimentally contaminated with nervous tissues
(>10 – 11 $\log_{10}LD_{50}$/g of tissue) from BSE positive cows

↓

Spray-wash at high pressure with 1 N KOH at room temperature

↓

Soak in 3 liters 1 N KOH for 60 min at room temperature

↓

Rinse with water

↓

Trim the external layer that was exposed to the chemicals

Trimmings are rendered　　　Trimmed whole muscle is processed
　　　　　　　　　　　　　for retail cuts using conventional techniques

FIG. 3

METHOD OF SANITIZING A BIOLOGICAL TISSUE

CROSS-REFERENCE TO RELATED APPLICATIONS

This application claims priority to provisional application Ser. No. 60/536,490, filed Jan. 14, 2004.

STATEMENT REGARDING FEDERALLY SPONSORED RESEARCH OR DEVELOPMENT

Not Applicable

STATEMENT REGARDING GOVERNMENT RIGHTS

Not Applicable

BACKGROUND OF THE INVENTION (1) Field of the Invention

This invention relates to a method for sanitizing a biological tissue to eliminate infectious agents and small proteins such as conformationally altered prions, bacteria, fungi, parasites and viruses, particularly in fresh meat carcasses to provide the highest possible health protection standards to meat consumers.

(2) Description of the Related Art

Transmissible Spongiform Encephalopathies, or Prion diseases, are fatal neurodegenerative diseases that affect both humans and animals. Examples include Creutzfeldt-Jacob disease (CJD) in humans, Bovine Spongiform Encephalopathy (BSE) in cattle and scrapie in sheep and goats. They are characterized by a long incubation period, ranging from months to years, and a variable length clinical course, both determined by the particular infection and the species involved. In Japan, 2 cases of BSE in cattle under the age of 30 months were found and another two (2) cases were found, also under the age of 30 months, in Europe (Dehaven, 2003). BSE is caused by a transmissible agent, which has been detected in the brain, spinal cord of natural cases of BSE and the distal ileum, optic nerve, dorsal root ganglia and in the bone marrow of cattle experimentally infected with BSE. The infectious agent has not been detected in other tissues which have been tested in transmission experiments in laboratories rodents (Wells et al., 1998).

While there has been an overall increase in the number of CJD cases observed, this was attributed to an ascertainment bias; however, a new form of CJD with a different clinical presentation and pathology was identified in 1996 (Will et al. 1996). This led scientists to suspect a possible link between BSE and the new form of the human Creutzfeldt-Jacob disease (vCJD). Experimental strain typing of variant vCJD has shown that the transmissible agent responsible for this disorder is identical to that in BSE, providing further evidence to support the hypothesis that exposure to the BSE agent, presumably through diet, is the cause of vCJD (Ironside, 1998). Since 1995, vCJD has killed more than 150 people in Europe based upon post mortum testing, and it is uncertain as to how many people harbor latent vCJD infections from having eaten tainted beef.

The nature of the transmissible agent in BSE is not known. Currently, the most accepted theory is that a component of the infectious agent is a normal protein (the prion protein) found in nervous tissue of all mammals (Prusiner and Scott, 1997). This prion protein assumes a typical conformation in animals not incubating BSE; however, animals that are incubating the disease have, in addition to the normal form (prion protein cellular, $PrP^c$ a conformationally altered form (prion protein scrapie, $PrP^{Sc}$).

Hilton et al., (1998) reported that vCJD can be detected in the human appendix before the first symptoms of the disease appeared. Studies on scrapie, the sheep equivalent of CJD, revealed that lymphoid tissue, such as in the gut, tonsils, and spleen, were infected with prions a third of the way through the incubation period and long before symptoms developed (Schreuder et al., 1998). Cattle incubating BSE without having any clinical signs or detectable pathology of the disease were identified in Ireland (Rogers et al., 2000).

Unlike microbes, conformationally altered prions are not completely destroyed by sterilization, traditional autoclaving, disinfectants, radiation, or cooking and they remain intact for years after an infected animal is buried. They are currently totally degraded only with incineration at temperatures greater than 1,000° F.

Secretary of Agriculture Ann M. Veneman at a press conference on Dec. 30, 2003, announced that the U.S. Dept. of Agriculture will continue its BSE surveillance program, available on the APHIS web site (www.aphis.usda.gov/oa/bse/), and will take the following additional actions to guard against BSE:

Ban of all nonambulatory cattle from the human food chain.

Usage of mechanically separated meat is prohibited in human food.

Specified risk materials skull, brain, trigeminal ganglia, eyes, vertebral column, spinal cord and dorsal root ganglia of cattle over 30 months of age and the small intestine of cattle of all ages cannot be used in the human food supply. These enhancements are consistent with the actions taken by Canada after the discovery of BSE in May, 2003.

Ban the practice of air-injection stunning.

Ante- and post-mortem inspection of cattle that are slaughtered in the United States. As part of the ante-mortem inspection, FSIS personnel look for signs of disease, including signs of central nervous system impairment. Animals showing signs of systemic disease, including those exhibiting signs of neurological impairment, are condemned. Meat from all condemned animals has never been permitted for use as human food.

Specified risk materials cannot be used for Advanced Meat Recovery.

However, the demonstration of a causal relationship between the agent of BSE and vCJD, the finding that prions can lurk in organs long before people or animals show signs of the disease, the identification of BSE positive animals under the age of 30 months; the unavailability of diagnostic tests that would permit widespread screening of live animals carrying the infectious agent; the potential weaknesses in the implementation of the preventive measures to control BSE; the risks of microbiological handling due to the increased handling involved, the various origins of cattle; and the conventional sanitization procedures used in the abattoirs cause concerns that the new actions taken by the USDA, in addition to the BSE surveillance program, may not be sufficient to completely eliminate the risk of transmission of BSE prions to humans through meat consumption. The finding that the prions can be detected in animals before symptoms appear may have two (2) alarming implications: (1) that these animals might pass the ante-mortem checking, since they have no clinical signs of central nervous system dysfunction, and could escape the post-mortem tests, because not all animals are tested and, therefore, may enter the food chain; (2) instruments and equipment used on those animals in the abattoirs and meat cutting plants could pass on the disease to BSE negative carcasses.

Despite all the assurances of federal officials that U.S. meat is safe, since the specified risk materials are removed from cows before the meat is processed for human consumption and prions have not been found in beef muscle, a number of countries have banned U.S. beef imports ever since the BSE case was announced on Dec. 23, 2003. Public perception has a profound impact on the beef industry—whether based on facts or media driven emotions. Thus, even the perception of a BSE problem could create an economic crisis.

The consumers' loss of confidence in meat and meat products as well as the associated economic loss result from the lack of adequate methods that offer absolute proof of purity (free of specified risk materials tissues) and safety of meat. Kimberlin et al., (1983) found that at least $10^4$-$10^5$ units of infectivity were lost by treatment with hypochlorite (chlorine bleach) containing 1,000 ppm available chlorine after a 4-16 hour exposure. They reported that full strength sodium hypochlorite (20,000-50,000 ppm) is effective for the inactivation of prions on surfaces, such as in the pathology laboratories. Although this procedure may be appropriate for the decontamination of laboratory, operating room, or autopsy room surfaces with central nervous system tissue contact from a known or suspected patient, this approach is unacceptably toxic at this concentration for use in food products.

Taylor, (1998) reported that BSE-infected bovine brain and scarpie-infected rodent brain exposed to 1 or 2 M sodium hydroxide for up to 2 hours did not completely inactivate the infectivity of prions, and permitted the survival of up to four logs of infectivity. Brown et al., (1982) reported that autoclaving for one hour at a temperature of at least 121° C. (15 psi) completely sterilizes CJD-infected materials (metal instruments, glassware, microtome knives). But this procedure cannot be applied to fresh meat carcasses to eliminate pathogenic infectious agents because it is very detrimental to the quality and functionality of the final product.

The prior art indicates that research laboratories have devised sanitization techniques, based on autoclaving and chemical disinfectants, which are suitable for their own purposes but not necessarily applicable to abattoir practice.

The committee on Health Care Issues of the American Neurological Society (Rosenberg et al., 1986) reported that boiling, ultraviolet irradiation, ethylene oxide sterilization, ethanol, formalin, beta-propiolactone, detergents, quaternary ammonium compounds, Lysol, alcoholic iodine, acetone, potassium permanganate are ineffective in inactivating the infectivity of prions.

U.S. Patent Application No. 2004 0213750 A1 describes the use of alkaline ethanolic solutions for disinfecting hard surfaces. There is no suggestion of destroying infectious prions in meat or biological tissue.

Therefore, the prior art has recognized the need for safe and cost effective methods, that are not detrimental to the flavor and texture of the final product, to decontaminate fresh meat carcasses that may have been cross-contaminated with tissues from the specified risk materials of BSE positive cattle containing high titers of infectivity, which expose the consumer to the risk of developing vCJD. There is also a need for the decontamination of biological tissues in general outside of the food supply.

OBJECTS

It is an object of the present invention to provide a method for disinfecting fresh meat carcasses or other biological tissue that may have been contaminated with pathogenic infectious agents. These agents are conformationally altered prions, bacteria, viruses, fungi and parasites. The treatment particularly includes BSE positive cattle, possibly containing high titers of infectivity, without altering the regular end use of the treated meat as a food. Further, it is an object of the present invention to eliminate pathogenic infectious agents in meat carcasses using a multiple intervention process. Further still, it is an object of the present invention to provide methods that are safe and inexpensive to perform, which preserve the flavor, color, and texture of the treated carcasses and which can be easily scaled-up to large volumes using conventionally available equipment. These and other objects will become increasingly apparent by reference to the following discussion and drawings.

These and other objects will become increasingly apparent by reference to the following description.

SUMMARY OF THE INVENTION

The present invention relates to a method for sanitizing a biological tissue which comprises treating the tissue with an aqueous solution selected from the group consisting of an alkali metal hydroxide, alkaline earth metal hydroxide and mixtures thereof and a lower alkanol containing 1 to 6 carbon atoms such that any prions in contact with the solution are inactivated. Preferably any microorganisms on the tissue are inactivated. Preferably the tissue is as a cut of an animal which is used for food. Preferably the tissue is from a ruminant. Preferably the tissue is meat for food which is washed and then is trimmed so that the surfaces are aesthetically pleasing. Preferably the alcohol is ethanol and the tissue is meat for food which is as a side of the animal in a processing plant. Preferably the alcohol is ethanol and the tissue is meat for food which is treated by spray washing with the solution and then washed in the solution which comprises a neutralizing agent. Preferably the tissue is meat which is food grade which is then washed in an aqueous solution comprising a food grade neutralizing agent. Preferably the alcohol is ethanol and the tissue is meat for food which is treated by being sprayed with the aqueous solution.

The invention also relates to a method for sanitizing meat which comprises treating surfaces of the meat with an aqueous solution of an alkali metal hydroxide and ethanol such that any prions in contact with the solution are inactivated; and washing the surfaces of the meat with an aqueous solution so that the meat has a pH between about 5 and 8. Preferably any microorganisms on the meat are inactivated. Preferably the meat is as a cut of an animal which is used for food. Preferably the meat is from a ruminant. Preferably the meat is trimmed so that the surfaces are aesthetically pleasing. Preferably the meat is as a side of the animal in a processing plant. Preferably the surfaces of the meat are treated by spray washing with the solution and washed in the solution which comprises a neutralizing agent. Preferably the aqueous solution comprises a food grade neutralizing agent.

This invention particularly relates to a multiple intervention process for disinfecting fresh meat carcasses which comprises the steps of: (a) spray-washing the fresh red meat (with or without bones) at high pressure with aqueous alcoholic solutions of food grade base comprising an alkali metal hydroxide (NaOH, KOH), an alkaline earth metal hydroxide or a mixture thereof at room or lower/higher temperature so that to eliminate or reduce visible and invisible infectious contaminants on the meat surfaces; and/or (b) soaking (dipping) the meat in an alcoholic solution of food grade base comprising alkali metal hydroxide (NaOH, KOH) or an alkaline earth metal hydroxide or a mixture thereof at room or lower/higher temperature for as long as needed so that to eliminate the infectivity of conformationally altered prions and other infectious agents; (c) soaking the base treated meat in food grade acid and then comprising strong acids (hydrochloric acid, sulfuric acid) or weak acids (lactic, citric, propionic, acetic) or a mixture thereof so that to eliminate any residual infectivity in the meat after being washed and soaked in the base, and (d) physically removing the visible discoloration due to the base and acid treatments by trimming the affected area from the carcass to provide aesthetically acceptable cuts for retail market.

The substance and advantages of the present invention will become increasingly apparent by reference to the following drawings and the description.

BRIEF DESCRIPTION OF DRAWINGS

FIG. 1 is a flow diagram showing a preferred multiple intervention process for the decontamination of fresh red meat carcasses. The process consists of spray-washing at high pressure a fresh whole muscle with 1 N ethanolic KOH. The spray-washed meat is soaked in 3 liters 1 N ethanolic KOH for 1 h. The base treated meat is then soaked in 3 liters 1 N HCl for 1 h. The treated meat is washed with water and the external layer of the meat that was exposed to the chemicals is trimmed and rendered, and the trimmed meat, which is free of contaminants, is processed for retail cuts.

FIG. 2 is a flow diagram showing a preferred multiple intervention process for the decontamination of fresh red meat carcasses. The process consists of spray-washing at high pressure a fresh whole muscle with 1 N ethanolic KOH. The spray-washed meat is soaked in 3 liters 1 N ethanolic KOH for 1 h. The base treated meat is then soaked in 3 liters 0.4 M citric acid for 1 h and then washed with water and ground using a ⅛" plate free of infectious agents.

FIG. 3 is a flow diagram showing a preferred multiple intervention process for the decontamination of fresh red meat carcasses. The process consists of spray-washing at high pressure a fresh whole muscle with 1 N ethanolic KOH. The spray-washed meat is soaked in 3 liters 1 N ethanolic KOH for 1 h. The base treated meat is washed with water and the external layer of the meat that was exposed to the chemicals is trimmed and rendered, and the trimmed meat, which is free of contaminants, is processed for retail cuts.

FIG. 4 is a photograph of a western blot showing the effects of treatment of artificially contaminated human brain tissue to compositions of the present invention wherein the blot is based upon luminescent detection.

FIG. 5 is a Western blot showing the effect of treatment of naturally contaminated deer brain tissue to compositions of the present invention, wherein the blot is based upon a visual stain.

DESCRIPTION OF THE PREFERRED EMBODIMENTS

The present invention particularly describes a method for the sanitization of fresh red meat carcasses that may have been cross-contaminated with pathogenic infectious agents and tissues from the specified risk materials of BSE positive cattle containing possibly high titers of infectivity, which expose the consumer to the risk of developing vCJD.

A preferred process for elimination of pathogenic infectious agents consisting of conformationally altered prions, viruses, bacteria, fungi, and parasites in fresh red meat carcasses is outlined in FIG. 1. The process uses multiple intervention strategies comprising washing, soaking, trimming, and using food grade chemicals such as alcohol, alkali metal hydroxide, alkaline earth metal hydroxide, and strong and weak acids. The base solutions are prepared in alcohol. It was found that alkoxides or a mix of alkoxides (Na, K ethoxide) and hydroxide is far more efficient than hydroxide alone in denaturing the prion protein. The mix proposed in this invention reduced the contact time with the infectious prion protein to less than 1 minute at room temperature compared to 1 hour followed by autoclaving when treated with hydroxide alone as recommended by the World Health organization. Ethoxides are more alkaline than hydroxide and stronger. They are used as nucleophilic ions and as a reducing agent. Ethoxides are formed when an alcohol is treated with a much stronger base according to either of the following reactions:

$$CH_3CH_2OH + NaH \longrightarrow H2 + CH_3CH_2O\,Na$$

$$CH_3CH_2OH + KOH \rightleftharpoons CH_3CH_2O\,K + H_2O$$

Potassium ethoxide was preferably prepared by reacting ethanol with potassium hydroxide. The rational for each step in the process is described below.

EXAMPLE 1

A 2 lb fresh whole muscle (one piece with or without bones) from beef round or chuck, which was experimentally contaminated with central nervous system tissue-fragments (brain tissues) from normal sheep brain, was spray-washed at high pressure with 1 N ethanolic KOH (ethanol:$dH_2O$, v:v, 76:24) at room temperature to eliminate or reduce visible and invisible contaminants. The wash base solution was filtered, the filtrate is sterilized and the retentate was meticulously collected and completely incinerated for safety reasons. The spray-washed meat was soaked in 3 liters 1 N ethanolic KOH (ethanol:$dH_2O$, v:v, 76:24) for 1 h at room temperature. The solution optionally was agitated, using a conventional pump or other means, by circulating it in and out of the soaking tank in a loop form to maintain a uniform medium. The ethanolic KOH medium was filtered on each passage. The base treated meat was washed with water and then soaked in 3 liters 1 N HCl for 1 h at room temperature for neutralizing the base. The acid treated meat was washed with water and the external layer of the meat that was exposed to the chemicals is trimmed and rendered, and the trimmed meat, which was free of contaminants, was processed for retail cuts using conventional methods used in meat cutting plants. The brain tissues were undetectable.

In developing decontamination processes for food products, the goal of complete inactivation of infectious agents imposes rigorous conditions on the experimental design. Multiple experiments are necessary to reveal an experimental variability that may produce fluctuations between total and nearly total inactivation. The process parameters (temperature, acid and base concentrations, chemical nature of solvents, soaking time), which are the key for inactivating the BSE agent, can be optimized so as to get a maximal removal of specified risk materials contaminating tissues and rid the meat that is going to the food chain from all infectivity.

EXAMPLE 2

Meat becomes contaminated with pathogens and specified risk material tissue-fragments from BSE positive cows during slaughter, processing and preparation for consumption. The physical removal of visible contamination by trimming the affected area from the carcass causes concerns regarding the possible spread of pathogens by contaminated knives and increased handling by workers and inspectors in abattoirs. Washing meat carcasses with an aqueous or ethanolic solution of KOH was an effective measure for reducing contamination. However, the effectiveness of this washing step in reducing pathogenic contamination depends upon the concentration of KOH in ethanol, and the temperature.

The effect of these different parameters on the reduction of prion infectivity in fresh red meat was determined according to the experimental conditions outlined in FIG. 1 and reported in the following experiments in Tables 1 and 2.

TABLE 1

Effect of ethanolic KOH wash solution concentrations on reducing the infectivity of prions

| Concentration (N) | Temperature (° C.) | Initial titer $Log_{10}LD_{50}$ | Residual titer $Log_{10}LD_{50}$ |
|---|---|---|---|
| 0 | 25 | 10-11 | No effect |
| 1 | 25 | 10-11 | Not detectable |
| 2 | 25 | 10-11 | Not detectable |
| 3 | 25 | 10-11 | Not detectable |

TABLE 2

Effect of ethanolic KOH wash solution temperatures on reducing the infectivity of prions

| Concentration (N) | Temperature (° C.) | Initial titer $Log_{10}LD_{50}$ | Residual titer $Log_{10}LD_{50}$ |
|---|---|---|---|
| 1 | 25 | 10-11 | Not detectable |
| 1 | 40 | 10-11 | Not detectable |
| 1 | 55 | 10-11 | Not detectable |
| 1 | 70 | 10-11 | Not detectable |

The results were significant and unexpected.

EXAMPLE 3

Fragments of specified risk materials from BSE positive cows and pathogenic microorganisms attached to fresh red meat carcass surfaces can not be easily removed by washing alone. The chemical composition of these contaminants consists of lipids, proteins, carbohydrates, and some minerals. Although washing is a very important step in this multiple intervention process, the concerns associated with it include the possibility of a less than complete decontamination and possible spreading of contamination to previously uncontaminated areas. Therefore, the intercalation of a soaking (dipping) step in the present decontamination process is desirable to provide an additional means to eliminate or reduce the infectivity of pathogens. In this step, the washed meat is completely immersed in the disinfection or sanitation medium such as all the meat surfaces are in contact with the medium. The effectiveness of this dipping step in reducing pathogenic contamination depends upon the concentration of KOH, temperature and soaking time. The effect of these different parameters on the reduction of prion infectivity and other pathogens in fresh red meat was done according to the experimental conditions outlined in FIG. 1 and reported in the following experiments in Tables 3, 4 and 5.

TABLE 3

Effect of ethanolic KOH soaking solution concentrations on reducing the infectivity of prions

| Concentration (N) | Temperature (° C.) | Time (min) | Initial titer $Log_{10}LD_{50}$ | Residual titer $Log_{10}LD_{50}$ |
|---|---|---|---|---|
| 1 | 25 | 60 | 10-11 | Not detectable |
| 2 | 25 | 60 | 10-11 | Not detectable |
| 3 | 25 | 60 | 10-11 | Not detectable |

TABLE 4

Effect of ethanolic KOH soaking solution temperatures on reducing the infectivity of prions

| Concentration (N) | Temperature (° C.) | Time (min) | Initial titer $Log_{10}LD_{50}$ | Residual titer $Log_{10}LD_{50}$ |
|---|---|---|---|---|
| 1 | 25 | 60 | 10-11 | Not detectable |
| 1 | 45 | 60 | 10-11 | Not detectable |
| 1 | 55 | 60 | 10-11 | Not detectable |

TABLE 5

Effect of soaking time and temperature in ethanolic KOH solution on reducing the infectivity of prions

| Concentration (N) | Temperature (° C.) | Time (min) | Initial titer $Log_{10}LD_{50}$ | Residual titer $Log_{10}LD_{50}$ |
|---|---|---|---|---|
| 1 | 25 | 1 | 10-11 | Not detectable |
| 1 | 25 | 5 | 10-11 | Not detectable |
| 1 | 25 | 15 | 10-11 | Not detectable |
| 1 | 25 | 45 | 10-11 | Not detectable |
| 1 | 25 | 60 | 10-11 | Not detectable |
| 1 | 25 | 120 | 10-11 | Not detectable |
| 1 | 40 | 5 | 10-11 | Not detectable |
| 1 | 40 | 15 | 10-11 | Not detectable |
| 1 | 40 | 45 | 10-11 | Not detectable |
| 1 | 40 | 6 | 10-11 | Not detectable |
| 1 | 40 | 120 | 10-11 | Not detectable |
| 1 | 55 | 5 | 10-11 | Not detectable |
| 1 | 55 | 15 | 10-11 | Not detectable |
| 1 | 55 | 45 | 10-11 | Not detectable |
| 1 | 55 | 60 | 10-11 | Not detectable |
| 1 | 55 | 120 | 10-11 | Not detectable |

The chemical treatment applied to the fresh red meat carcass during the washing and dipping steps can cause irreversible discoloration of the carcass surfaces which may be undesirable to consumers. The present multiple intervention process uses the physical removal of visible discoloration by trimming the affected area from the carcass to provide aesthetically acceptable cuts for retail market.

EXAMPLE 4

For the production of ground meat, the trimming step is not necessary if the pH of the treated meat is adjusted to the original level, during the acid soaking step, using a weak acid such as citric acid according to the experimental conditions shown in FIG. 2 and explained in detail below. The main challenge in raw ground beef is the decontamination of whole muscles that may have been contaminated with BSE infected tissues from the specific risk materials before they get to the grinder. A 2 lb fresh whole muscle (one piece with or w/o bones) from beef round or chuck, which was experimentally contaminated with central nervous system tissue-fragments having a high infectivity titer (>10-11 $\log_{10}LD_{50}/g$) from BSE positive cattle, was spray-washed at high pressure with 1 N ethanolic KOH (ethanol:$dH_2O$, v:v, 76:24) at room temperature to eliminate or reduce visible and invisible contaminants. The spray-washed meat was soaked in 3 liters 1 N ethanolic KOH (ethanol:$dH_2O$, v:v, 76:24) for 1 h at room temperature. The base treated meat was washed with water and then soaked in 3 liters 0.4 M citric acid at room temperature for 1 h or until the pH of the treated meat, after grinding, was similar to the pH of regular ground beef. The meat was washed with water after the citric acid step and grind using conventional methods used in meat cutting plants. Prion proteins ($PrP^c$ or $PrP^{Sc}$) were undetectable.

EXAMPLE 5

This multiple intervention method can use an acid treatment, after the base treatments, to eliminate any residual infectivity in the meat. However, strong acids require a careful handling in the abattoirs or meat cutting plants. The effect of the acid treatment on the inactivation of infectious agents in fresh red meat carcasses, after being treated with base, is performed according to the experimental conditions reported in FIG. 3. The elimination of the acid step from the process shows whether the acid step is needed or not. A 2 lb fresh whole muscle (one piece with or w/o bones) from beef round or chuck, which was experimentally contaminated with central nervous system tissue-fragments having a high infectivity titer (>10-11 $\log_{10}LD_{50}$/g of tissue) from BSE positive cattle, was spray-washed at high pressure with 1 N ethanolic KOH (ethanol:$dH_2O$, v:v, 76:24) at room temperature to eliminate or reduce visible and invisible contaminants. The spray-washed meat was soaked in 3 liters 1 N ethanolic KOH (ethanol:$dH_2O$, v:v, 76:24) for 1 h at room temperature. The treated meat was washed with water and the external layer of the meat that was exposed to the solution was trimmed and rendered, and the trimmed meat, which was free of contaminants, was processed for retail cuts using conventional methods used in meat cutting plants. Prion proteins ($PrP^C$ or $PrP^{SC}$) were undetectable.

EXAMPLE 6

Treatment of Human Brain Tissue

Glass slides artificially contaminated with tissue sections obtained at autopsy from a human subject with sporadic Creutzfeldt-Jacob disease (with the absence of germline prion protein gene (PRNP) mutation, homozygous methionine at PRNP codon 129), were exposed to 1 minute and 10 minute treatments with Formula A (1N KOH in ethanol) and Formula B (2N KOH in ethanol) at room temperature. Following exposure, tissue was homogenized in lysis buffer as described by Castellani et al., (1996). Control CJD tissue, tissue exposed to Formula A, and tissue exposed to Formula B subsequently were treated with 2× sample buffer and boiled× 10 minute. A control CJD sample was also subjected to limited proteolysis (100 micrograms/ml proteinase K)×1 hour at 37° C., protease inhibitor (pefabloc) stopped the reaction, and equal volume of 2× sample buffer was added followed by boiling×10 minutes. All samples were then loaded on a 12% polyacrylamide minigel, electrophoresed at 150V, transferred to Immobilon transfer membrane (2 hours at 40° C.), and reacted with monoclonal antibody 3F4, which recognizes the residues 109-112 of human prion protein. Immunoreactivity was visualized by chemiluminescence and detected by standard autoradiography. The results are reported in FIG. 4. FIG. 4 is a Western-blot analysis of human brain tissue adsorbed on glass slide surfaces with and without exposure to Formula A (1N ethanolic KOH) and Formula B (2N ethanolic KOH). Lane 1 (CJD PK−) shows CJD brain tissue without proteinase K (PK−) and shows the 3 bands typical of prion protein (represented diglycosylated, monoglycosylated, and unglycosylated species). Lane 2 (CJD PK+) and lane 3 (CJD PK+) containing proteinase K-treated CJD tissue demonstrate the appropriate downward shift in molecular weight of the three glycoforms with proteinase K treatment. The unglycosylated band running at 21 kD indicates $PrP^{sc}$ stain "type 1" (Parchi et al., 1996). Lanes 4 (Formula A+CJD) treatment of 1 minute and lane 5 (Formula A+CJD) treatment of 10 minutes, both show the absence of the prion protein ($PrP^c$ or $PrP^{sc}$). Lane 6 (Formula B+CJD) treatment of 1 minute and lane 7 (Formula B+CJD) treatment of 10 minutes also both show the absence of the prion protein ($PrP^c$ or $PrP^{sc}$) Subsequent analyses of proteinase K-treated CJD tissue, followed by treatment with Formula A and B, showed a similar reaction.

EXAMPLE 7

Treatment of Deer Brain Tissue

Purpose: Run a western blot on Formula A and Formula B (Example 6) treated brain protein to confirm that the protein is denatured. Run two gels, one to blot and one to stain for protein.

Procedure: A well mixed slurry of deer brain tissue in homogenization buffer @1:20 was divided into 8 tubes of 100 μl each. Samples were treated as noted.

3A—10 μl digestion buffer plus 10μ ProteinaseK, heated 40 min at 48 C. Brain plus—Then 10 μl stop solution added.

4B—Brain plus 10 μl digestion buffer plus 10 μl ddwater, heated 40 min at 48 C. Then 10 μl stop solution added.

5C—Brain plus 10 μl Formula A, vortex. Incubate at room temperature 2 minutes. Centrifuge, remove supernatant, wash two times in 200 ul ddwater. Re-suspend pellet in 120 μl ddwater.

6D—Same as C using Formula B.

7E—Brain plus 100 μl Formula A, vortex. Incubate at room temperature for 40 minutes. Centrifuge, remove supernatant, wash two times in 200 μl ddwater. Re-suspend pellet in 120 μl ddwater.

8F—Same as E using Formula B.

9G—Brain plus 100 μl Formula A, vortex. Incubate at 48 C for 40 minutes. Centrifuge, remove supernatant, wash two times in 200 μl ddwater. Re-suspend pellet in 120 μl ddwater.

10H—Same as G using Formula B.

Added 100 μl SDS Page sample buffer to each of the samples and heat denatured for 5 minutes at 95 C.

Samples were run on a 12% SDS Page gel using a 10 well comb. 10 μl of each denatured sample was run except for the positive control (B, 3 μl). Also, 10 μl of a western blot CWD kit control denatured at 65 C for 2 minutes was run in one lane and one lane held 10 μl of BioRad protein standards.

The gel was stained with the BioRad silver stain kit. The blot was tested using mouse monoclonal antibody 6H4, biotin labeled anti-mouse antibody, EXTRAVIDIN™ and developed with AEC-DMF (3-amino-9-ethylcarbazole in dimethylformamide; Sigma, St. Louis, Mo.).

Figure 5:
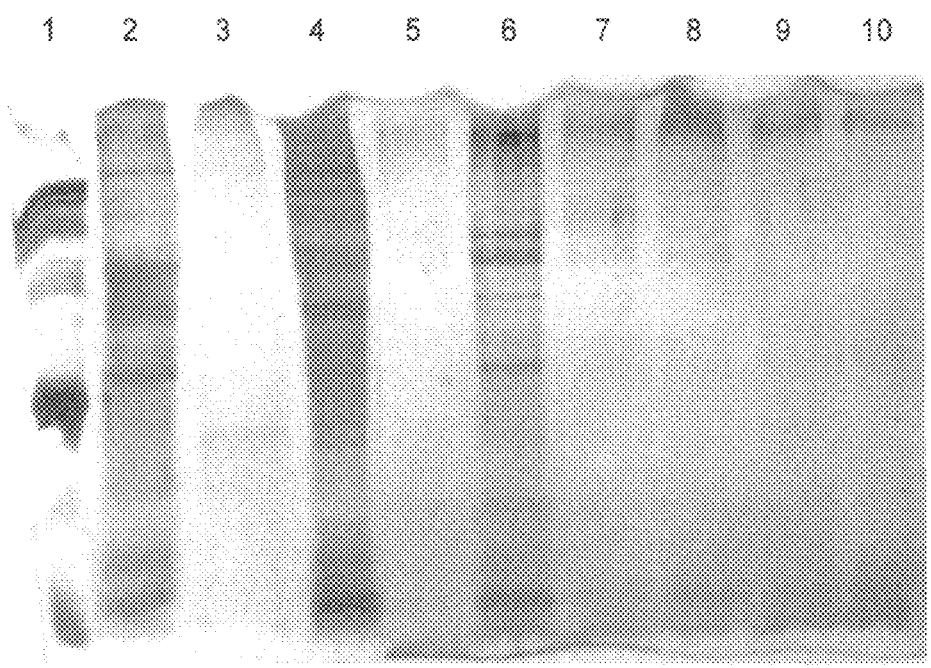

In reference to FIG. 5:
Lane 1—Size standard
Lane 2—10 µl kit positive control
Lane 3—Brain plus 10 µl digestion buffer plus 10 µl ProteinaseK, heated 40 min at 48 C. Then 10 µl stop solution added.
Lane 4—Brain plus 10 µl digestion buffer plus 10 µl ddwater, heated 40 min at 48 C. Then 10 µl stop solution added.
Lane 5—Brain plus 100 µl of Formula A, vortex. Incubate at room temperature 2 minutes. Centrifuge, remove supernatant, wash two times in 200 µl ddwater. Re-suspend pellet in 120 µl ddwater.
Lane 6—Same as C using Formula B.
Lane 7—Brain plus 100 µl Formula A, vortex. Incubate at room temperature for 40 minutes. Centrifuge, remove supernatant, wash two times in 200 µl ddwater. Re-suspend pellet in 120 µl ddwater.
Lane 8—Same as E using Formula B.
Lane 9—Brain plus 100 µl Formula A, vortex. Incubate at 48 C for 40 minutes. Centrifuge, remove supernatant, wash two times in 200 µl ddwater. Re-suspend pellet in 120 µl ddwater.
Lane 10—Same as G using Formula B.

Results: Formula A denatured almost all protein at 2 minutes, Formula B did not. Formula A and Formula B denatured almost all protein at 40 minutes room temperature incubation. Formula A and Formula B denatured all protein at 40 minutes, 48 C incubation. All protein of a size relevant to CWD was completely denatured except for Formula B at 2 minutes. The western blot lanes all were negative except for the kit standard with a weak band at approximately 30-31 kDa and the positive control (B) with a broad band from approximately 25 to 35 kDa.

The conclusion was Formula A worked quicker than Formula B to denature all relevant proteins. Formula A was effective within 2 minutes of exposure.

Other alcohols are methanol, propanol, butanol, pentanol and hexanol, and the various isoforms with the base. These alcohols are used with non-food treatments of biological tissue.

The method of the present invention is used to treat human foods. It is also used to treat animal feeds as foods.

While particular embodiments of the invention were illustrated and described, it will be obvious to those skilled in the art that various changes and modifications can be made without departing from the spirit and scope of this invention. Thus it is intended that the foregoing description be only illustrative of the present invention and that the present invention be limited only by the hereinafter appended claims.

I claim:

1. A method for sanitizing a biological food tissue which is possibly infected with prions, the method comprising:
   (a) selecting ruminant biological food tissue (i) that is contaminated with infectious prions and (ii) that has been exposed to specified risk material tissue from another ruminant, the specified risk material tissue being selected from the group consisting of skull, brain, trigeminal ganglia, eyes, vertebral column, spinal cord, dorsal root ganglia, small intestine, and combinations thereof; and,
   (b) treating the tissue with an aqueous solution comprising (i) a hydroxide selected from the group consisting of an alkali metal hydroxide, alkaline earth metal hydroxide and mixtures thereof and (ii) a lower alkanol containing 1 to 6 carbon atoms such that any infectious prions in contact with the aqueous solution are inactivated, thereby sanitizing the biological food tissue.

2. The method of claim 1 wherein any microorganisms on the tissue are inactivated.

3. The method of claim 1 wherein the tissue is a cut of an animal which is used for food.

4. The method of claim 1 wherein the tissue is meat for food which is washed with the aqueous solution, thereby exposing an external layer of the meat to the aqueous solution, and the meat then is trimmed to remove the exposed external layer of the meat so that the surfaces are aesthetically pleasing.

5. The method of claim 1 wherein the lower alkanol is ethanol and the tissue is meat for food which is a carcass of an animal in a processing plant.

6. The method of claim 1 wherein the lower alkanol is ethanol and the tissue is meat for food which is (i) treated by spray washing with the aqueous solution, (ii) soaked in the aqueous solution, (iii) and then washed in an additional aqueous solution which comprises a food grade neutralizing agent selected from the group consisting of hydrochloric acid, sulfuric acid, lactic acid, citric acid, propionic acid, and combinations thereof.

7. The method of any one of claim 1, 2, 3, 4, 5 or 6 wherein the tissue is meat which is food grade which is then washed in an additional aqueous solution comprising a food grade neutralizing agent selected from the group consisting of hydrochloric acid, sulfuric acid, lactic acid, citric acid, propionic acid, and combinations thereof.

8. The method of claim 1 wherein the lower alkanol is ethanol and wherein the tissue is meat for food which is treated by being sprayed with the aqueous solution.

9. A method for sanitizing meat food tissue which is possibly infected with prions, the method comprising:
   (a) selecting ruminant meat food tissue (i) that is possibly contaminated with infectious prions and (ii) that has been exposed to specified risk material tissue from another ruminant, the specified risk material tissue being selected from the group consisting of skull, brain, trigeminal ganglia, eyes, vertebral column, spinal cord, dorsal root ganglia, small intestine, and combinations thereof;
   (b) treating surfaces of the meat with an aqueous solution consisting essentially of an alkali metal hydroxide and ethanol such that any infectious prions in contact with the aqueous solution are inactivated, thereby sanitizing the meat; and
   (c) washing the surfaces of the meat with an additional aqueous solution so that the meat has a pH between about 5 and 8, the additional aqueous solution comprising a food grade neutralizing agent selected from the group consisting of hydrochloric acid, sulfuric acid, lactic acid, citric acid, propionic acid, and combinations thereof.

10. The method of claim 9 wherein any microorganisms on the meat are inactivated.

11. The method of claim 9 wherein the meat is a cut of an animal which is used for food.

12. The method of claim 9 wherein an external layer of the meat is exposed to the aqueous solution in step (b), and the meat is trimmed after step (c) to remove the exposed external layer of the meat so that the surfaces are aesthetically pleasing.

13. The method of claim 9 wherein the meat is a carcass of an animal in a processing plant.

14. The method of claim 9 wherein in step (b) treating the surfaces of the meat comprises spray washing with the aqueous solution and soaking in the aqueous solution.

15. The method of claim 1, wherein the prions are denatured to an undetectable level in the sanitized biological food tissue.

16. The method of claim 9, wherein the prions are denatured to an undetectable level in the sanitized meat.

17. The method of claim 1, wherein the lower alkanol is ethanol and the ruminant biological food tissue is a cattle carcass in a slaughterhouse.

18. The method of claim 17, wherein a surface of the cattle carcass is contaminated with infectious prions from the specified risk material.

19. The method of claim 9, wherein the ruminant meat food tissue is contaminated with infectious prions.

20. The method of claim 9, wherein the ruminant meat food tissue is a cattle carcass in a slaughterhouse.

21. The method of claim 20, wherein the cattle carcass is contaminated with infectious prions.

22. The method of claim 9, wherein the aqueous solution has a hydroxide concentration ranging from about 1 N to about 3 N and has an ethanol concentration of about 76 vol. %.

23. The method of claim 12, wherein the food grade neutralizing agent is selected from the group consisting of hydrochloric acid, sulfuric acid, and combinations thereof.

24. The method of claim 9, wherein the food grade neutralizing agent is selected from the group consisting of lactic acid, citric acid, propionic acid, and combinations thereof.

\* \* \* \* \*